March 25, 1969  G. T. INOUYE ET AL  3,435,337

SUPERCONDUCTIVE FLUXGATE MAGNETOMETER

Filed Dec. 11, 1964

George T. Inouye,
Darrell L. Judge,
INVENTORS.

BY.

*Jerry A. Dinardo*

AGENT.

George T. Inouye,
Darrell L. Judge,
INVENTORS.

George T. Inouye,
Darrell L. Judge,
INVENTORS.
BY.

AGENT.

George T. Inouye,
Darrell L. Judge,
INVENTORS.

George T. Inouye,
Darrell L. Judge,
INVENTORS.

United States Patent Office 3,435,337
Patented Mar. 25, 1969

3,435,337
SUPERCONDUCTIVE FLUXGATE MAGNETOMETER
George T. Inouye, Gardena, and Darrell L. Judge, Los Angeles, Calif., assignors to TRW Inc., Redondo Beach, Calif., a corporation of Ohio
Filed Dec. 11, 1964, Ser. No. 417,584
Int. Cl. G01r 33/02
U.S. Cl. 324—43                 4 Claims

ABSTRACT OF THE DISCLOSURE

This invention relates to a fluxgate-type of magnetometer, and more particularly to a magnetometer employing a superconductive element as a fluxgate. Various embodiments are shown in each of which there is provided a superconductive surface between an ambient magnetic field to be measured, such as the earth's magnetic field, and a pickup means oriented to respond to the component of ambient magnetic field normal to the superconductive surface. The superconductive surface extends a sufficient distance beyond the extremities of the pickup means to exclude an appreciable number of flux lines of the ambient magnetic field from the pickup means when the surface is in its superconductive state. Means are also provided for switching the superconductive surface in and out of the superconductive state at a given frequency so as to alternately expose and shield the pickup means from the magnetic field. In this way, the ambient magnetic field is chopped by the periodic changes in state of the superconductive surface. The chopping frequency is detected by a detector tuned to a harmonic of the chopping frequency to derive an output signal representative of the normal component of ambient magnetic field.

Background of the invention

A conventional fluxgate magnetometer consists of a saturable, high-permeability core with a drive coil and a pickup coil wound around it. The drive coil is used to drive the core into saturation alternately in the two opposite directions along the core axis. The flux lines threading through the pickup coil, then, is the sum of those created by the drive coil, and those due to the ambient field. Expressing the saturation of the core as a non-linear second degree term:

(1)     $B = aH + bH^2$ where B is the flux density, H is the magnetic field intensity, $a$ is the linear term coefficient, and $b$ is the nonlinear term coefficient. The total field intensity may be written as:

(2)     $H = H_{\text{drive}} + H_{\text{ambient}} : H_{\text{drive}} = H_d \sin \omega t$
        $H_{\text{ambient}} = H_a = \text{constant}$ Combining Equations 1 and 2:

$B = aH_d \sin \omega t + aH_a + bH_d^2 \sin^2 \omega t + bH_a^2/ + bH_d H_a \sin \omega t$ The last term in the above expression for B is proportional to $H_a$ and is sinusoidal with frequency $\omega/2\pi$. It is the nonlinear coefficient, $b$, which provides the sinusoidal term containing $H_a$. In the conventional fluxgate magnetometer, the nonlinearity due to the core saturation is detected at the second harmonic of the drive frequency rather than at the fundamental, since the signal at this frequency is nearly completely due to the ambient field, whereas the fundamental frequency signal may be large whether the ambient field is present or not.

An alternative view of the operation of the fluxgate magnetometer which is more easily pictured and related to its name is as follows. Since the drive coil saturates the core alternately in the two directions colinear with the core axis, the contribution of the ambient flux to the total flux threading the pickup coil is negligible except at the times at which the sense of saturation is reversing—i.e., the ambient flux is "gated on" only at the cross-over time, or the times, on the flux, B, versus time curves, when the flux B cross the time axis. The effect of the ambient flux is to shift the cross-over instants. When the ambient field is zero, the cross-over instants are evenly spaced; and this symmetry is upset by the ambient flux. The cross-over points on the negative half cycle of the flux versus time curves are wider spaced than those on the positive half cycle. The curve of flux, B, vs. time with $H_a = 0$ contains only even harmonics, whereas the curve with $H_a$ present contains odd harmonics as well as the even harmonics.

One disadvantage of the conventional fluxgate type of magnetometer is that it is limited in accuracy, as opposed to sensitivity, but the remanent magnetization of the core, which introduces an uncertainty in the zero level. Another disadvantage is the limitation placed on the sensitivity by certain sources of noise, such as the resistance of the output coil, the reflected resistance from the drive coil, and Barkhausen noise in the core material.

It is therefore an object of this invention to improve the accuracy of a fluxgate type of magnetometer.

A further object is to provide a fluxgate type of magnetometer of increased sensitivity.

Another object is to provide a magnetometer having a fluxgate of zero resistance for reducing noise.

Yet another object is to eliminate the ferromagnetic core in a fluxgate magnetometer in order to eliminate another source of noise.

The foregoing and other objects are achieved according to the invention by providing a superconductive surface between an ambient magnetic field to be measured, such as the earth's magnetic field, and a pickup means oriented to respond to the component of ambient magnetic field normal to the superconductive surface. The superconductive surface extends sufficient distances beyond the extremities of the pickup means to exclude an appreciable number of flux lines of the ambient magnetic field from the pickup means.

Means are provided for establishing a superconducting state in the superconductive surface. Means are also provided for causing the entire area of superconductive surface to alternate between the superconducting and normal states at a given frequency, so as to alternately expose and shield the pickup means from the ambient magnetic field. In this way the ambient magnetic field is chopped by the periodic changes in state of the superconductive surface. The chopping frequency is detected by a detector tuned to a harmonic of the chopping frequency to derive an output signal representative of the normal component of ambient magnetic field.

SUPERCONDUCTIVE PHENOMENA

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures and become superconductive, as noted:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconductive at temperatures ranging between 0° and around 20° Kelvin. A discussion of many such materials may be found in a book entitled "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material may be in an electrically resistive state even though the temperature of the material is lower than the normal transition temperature. The action of a current in lowering the temperature at which the transition occurs (from a state of normal electrical resistivity to one of superconductivity) is similar to the lowering of the transition temperature by an external magnetic field, inasmuch as the flow of current itself induces a magnetic field.

Accordingly, when a material is held at a temperature below its normal transition temperature for a zero magnetic field, and is thus in a superconductive state, the superconductive condition of the material may be extinguished by the application of an external magnetic field or by passing an electric current through the material.

Figure 1:
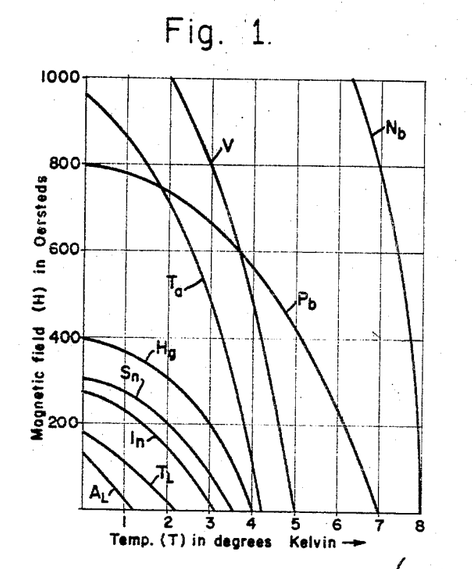
FIG. 1 is a phase diagram showing the magnetic field versus temperature characteristics of several superconductive materials.

FIG. 1 illustrates the variation in transition temperatures (T) for several materials as a function of an applied magnetic field. In the absence of a magnetic field, the point at which each of the several curves intercepts the abscissa is the transition temperature at which the material becomes superconductive. (The transition temperature for each material varies almost parabolically with the magnetic field applied to it, as expressed by the function $$\frac{H_c}{H_o} = 1 \left(\frac{T}{T_c}\right)^2$$

where $H_c$ is the critical magnetic field density for effecting a transition from the superconductive to the resistive state at any given temperature T, $H_o$ is the intercept of a curve on the ordinate axis, at zero degrees Kelvin, and $T_c$ is the transition temperature of the material in the absence of a magnetic field.) The transition temperature is given in degrees Kelvin. A particular material is superconductive for values of temperature and magnetic field falling beneath each of the several curves, while for values of temperature and magnetic field falling above a curve, the material possesses electrical resistance.

The invention

Figure 2:
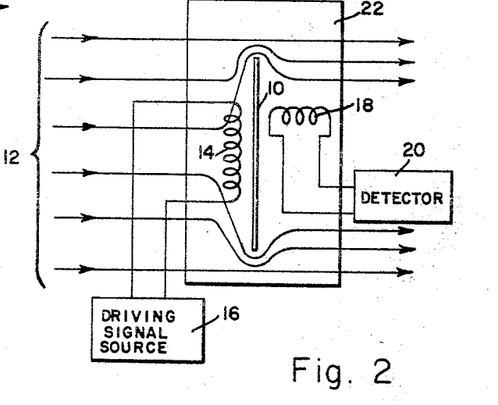
FIGS. 2–4 are schematic diagrams of one form of superconductive fluxgate magnetometer according to the invention.
Figure 3:
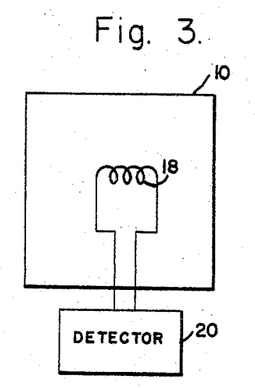

FIGS. 2 and 3 show schematic representations of a superconductive fluxgate type of magnetometer according to the invention. A sheet or surface 10 of superconductive material is disposed within a magnetic field originating on one side of the superconductive surface 10. The magnetic field is represented by magnetic flux lines 12 emanating from a direction normal to the superconductive surface 10.

A driving means, such as a coil 14, is mounted adjacent to the side of the superconductive surface 10 that is exposed to the magnetic flux lines 12. A source of driving signals, such as an alternating current source, is connected to the driving coil 14. The driving signal source 16 supplies an alternating current of sufficient magnitude to create an alternating magnetic field about the driving coil 14 that drives the entire volume of the superconductive surface 10 alternately between the normal and superconducting states.

A pickup means, such as a pickup coil 18, is mounted adjacent to the superconductive surface 10 on the opposite side thereof from the driving coil 14. A detector 20 is coupled to the pickup coil 18. As the superconductive surface 10 is driven alternately between the normal and superconducting states by the driving coil 14, the pickup coil 18 will be periodically exposed to portions of the magnetic flux lines 12. The pickup coil 18 is oriented with its axis parallel to the magnetic flux lines 12 so that it will cut the flux lines passing through the superconductive surface 10 when it is in the normal state. Accordingly, an alternating voltage is developed in the coil 18. The detector 20 is tuned to the frequency of alternations in the superconductive surface 10 to maximize the voltage signal developed in the pickup coil 18.

In order to maintain the superconductive surface 10 at a sufficiently low temperature to place it in the superconducting state, the superconductive surface 10 is mounted in a cryostat 22 such as a Dewar flask of liquid helium or other suitable coolant. If desired, the driving coil 14 and pickup coil 18 may also be made of superconductive material and placed in the cryostat 22.

The operation of the superconducting fluxgate magnetometer will now be described in more detail with the aid of the phase diagram of FIG. 5. It will first be assumed that the driving signal from the source 16 is zero. It will be further be assumed that the strength of the ambient magnetic field and the temperature of the cryostat is such as to place the superconductive surface 12 at some point S on the phase diagram below the critical temperature point J and below the critical magnetic field point K. For example, assuming the superconductive sheet is made of lead, an ambient magnetic field of 100 oersteds and a temperature of 6° K. will place the superconductive sheet 10 in a superconducting state corresponding to the point S on the phase diagram.

When the superconductive sheet 10 is in the superconductive state S, it is impervious to a magnetic field.

As a result, the magnetic flux lines 12 from the ambient field will not penetrate the superconductive sheet 10, but will be bent in the vicinity of the sheet 10 away from the pickup coil 18, in a manner similar to that shown in FIG. 2. The superconductive sheet 10 serves as a barrier against flux lines being intercepted by the pickup coil 18. The pickup coil 18 will develop zero voltage and the signal detected by the detector 20 will be zero.

If now an alternating current signal is applied to the driving coil 14 from the driving signal source 16, which will supply a peak alternating field of say 500 oersteds, the positive excursion of the field will add to the ambient field and raise the total resultant instantaneous magnetic field to a value in excess of the critical field point K, which is about 250 oersteds, and to a maximum field of 600 oersteds to a point N, which is above the critical field point K. On the positive excursion of the driving field then, the superconductive sheet 10 will be switched to the normal state. The magnetic flux lines 12 will penetrate the now normal superconductive sheet 10, in the manner shown in FIG. 4. The flux lines that penetrate the now normal sheet 10 will be cut by the pickup coil 18, which will develop a voltage proportional to the number of flux lines cut.

When the instantaneous value of the driving signal from the driving signal source 16 decreases to such an extent as to cause the resultant total magnetic field acting on the superconductive sheet 10 to drop below the critical field point K, the superconductive sheet 10, which was previously switched normal, will revert to the superconducting state. At this stage superconductive sheet 10 is in the superconducting state, the sheet 10 will once again act as a barrier to the magnetic flux lines 12, in the manner shown in FIG. 2, and no voltage will be developed in the pickup coil 18. When the instantaneous value of the driving field reduces to zero, it will place the total field at the point S at which the resultant field is that due to the ambient field alone.

Figure 4:
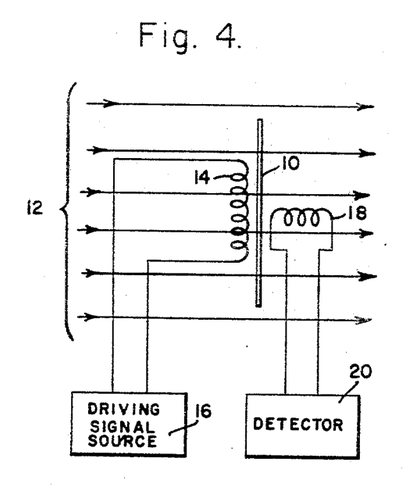

On the negative excursions of the driving field, the ambient and driving fields are subtractive, since they are in opposing directions. Thus, a negative driving field of about 350 oersteds is required to reach the critical field value of 250 oersteds, corresponding to the point L on the phase diagram. When the driving field is such as to cause the resultant field to exceed the critical field value of 250 oersteds, the superconductive sheet 10 will again transform to the normal state so as to pass the magnetic flux lines 12, as shown in FIG. 4. The flux lines 12 which pass and are cut by the pickup coil will give rise to a voltage in the pickup coil 18. The point M on the phase diagram is reached when the driving field reaches its maximum negative value of 500 oersteds.

The superconductive sheet 10 will remain normal until the negative value of the driving field reduces below 350 oersteds to place the total resultant field at the point L again. When the total field reduces below this point the superconductive sheet 10 goes superconducting again and remains superconducting when the driving field reduces to zero to place the total field at the point S, where the ambient field above is present. Between points L and S, the sheet 10 is superconducting and acts as a barrier to the flux lines 12. The condition of the superconductive sheet corresponds to that shown in FIG. 2, and the voltage developed in the pickup coil 18 is zero.

It will be seen that the driving signal acts to alternately switch the superconductive sheet 10 from the superconducting to the normal state and from the normal to the superconducting state. During each complete cycle of the driving signal, the superconductive sheet is twice switched from superconducting to normal and back to superconducting again. As a result, the pickup coil 10 is periodically exposed to the ambient field at twice the frequency alternations of the driving field. It can be said that the ambient field is gated or chopped at twice the frequency of the driving field. Accordingly, a maximum signal is sensed by the detector 20 when it is tuned to twice the frequency of the driving signal.

Figure 6:
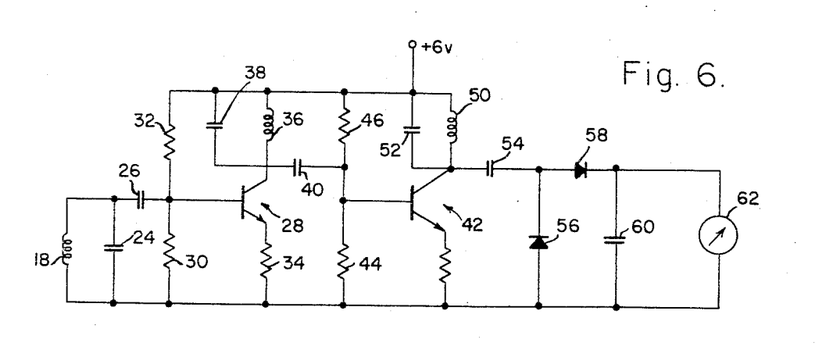
FIG. 6 is a schematic diagram of one type of detector circuit useful in the superconductive fluxgate magnetometer.

Referring to FIG. 6, which shows one example of a circuit for amplifying and rectifying the alternating current voltage developed in the pickup coil 18, the latter is connected in shunt with a capacitor 24 to form a tuned circuit tuned to twice the frequency of the driving signal from the driving signal source 16. The second harmonic signal selected by the tuned circuits is coupled through a coupling capacitor 26 to the base of a first npn transistor 28 forming a first amplifier circuit. The base of the first transistor 28 is connected to ground through a bias resistor 30 and through another bias resistor 32 to a direct current voltage supply having a typical value of 6 volts, for example. The emitter of the first transistor 29 is connected through a resistor 34 to ground. The collector of the first transistor 28 is connected to the direct current voltage supply through a parallel circuit, comprising an inductor 36 and a capacitor 38, that is tuned to the second harmonic of the driving signal.

The amplified second harmonic signal selected by the tuned circuit comprising the inductor 36 and the capacitor 38 is coupled through a coupling capacitor 40 to the base of a second transistor 42, which forms a second amplifier circuit. The second amplifier circuit is similar to the first one, and comprises bias resistors 44 and 46 connected to the base of a resistor 48 connected to the emitter, and a tuned circuit comprising an inductor 50 and a capacitor 52 connected to the collector, of the second transistor 42, respectively.

The amplified second harmonic signal selected by the tuned circuit comprising the inductor 50 and capacitor 52 is coupled through a capacitor 54 to a rectifier circuit comprising rectifying diodes 56 and 58 and a filter capacitor 60. The second harmonic signal is rectified by the rectifier circuit to produce a direct current signal, indicated on a meter 62, that is proportional to the strength of the ambient magnetic field.

Figure 7:
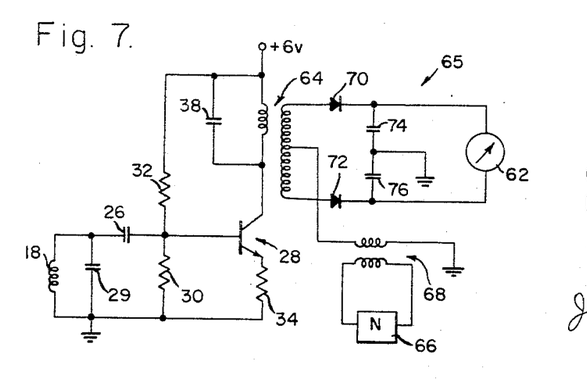
FIG. 7 is a schematic diagram of a different type of detector circuit useful in the superconductive fluxgate magnetometer.

Another example of a circuit for amplifying and rectifying the alternating current voltage developed in the pickup coil 18 is shown in FIG. 7. The circuit of FIG. 7 includes a first amplifier circuit similar to that of FIG. 6, except that the inductor 36 is replaced by the primary winding of a transformer 64. The amplified second harmonic signal is fed through the transformer 64 to a synchronous rectifier circuit 65. An alternating current signal having a frequency equal to twice the frequency of the driving signal and furnished by a source 66 in the synchronous rectifier 65 is coupled through a transformer 68 to the center tap of the secondary of the transformer 64. The secondary of the transformer 64 is connected to rectifying diodes 70, 72 and filter capacitors 74, 76, with the latter being grounded at their junction.

The synchronous rectifier 65 provites a means whereby the portion of the rectified output due to noise at the rectifier 65 input is minimized by use of a prior knowledge concerning the signal to be rectified, i.e. its frequency and phase. All noise contributions to the output which are not at or very near the reference signal are cancelled out by the two halves of the rectifier 65, whereas the signal components are additive in the two halves—provided that the reference signal is adjusted to be in phase with the signal to be rectified.

The direct current signal developed across the filter capacitors and indicated on the meter 62 is indicative of the strength of the ambient magnetic field.

It will be noted that a superconductive surface 10 of the form shown in FIG. 2 should have an extent appreciably greater that that of the pickup coil 18 so that when it is in the superconductnig state the superconductive surface 10 will exclude the greater proportion of magnetic flux lines of the ambient field from the pickup coil 18. It will be seen that if the pickup coil 18 has physical dimensions comparable to those of the superconductive surface 10, some of the magnetic flux lines 12 will cut the pickup coil even when the surface 10 is superconducting, thereby reducing the sensitivity.

Figures 8, 9, 10:
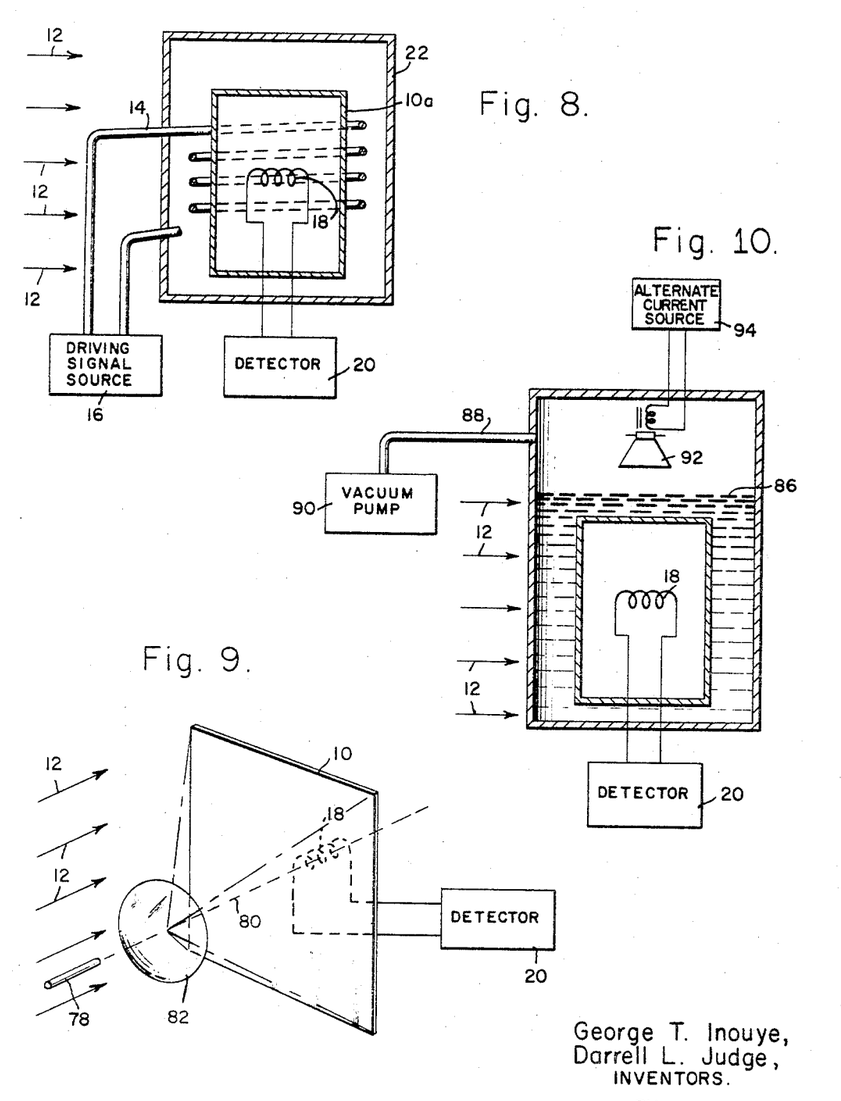
FIGS. 8, 9, and 10 are schematic diagrams of alternative forms of a superconductive fluxgate magnetometer according to the invention.

The magnetic flux lines may be more effectively shielded from the pickup coil 18 by means of the arrangement shown in FIG. 8. In this arrangement the pickup coil 18 is completely enveloped by a closed superconductive surface 10a. The driving coil 14 is wound around the superconductive surface 10a with its axis at right angles to the axis of the pickup coil 18 to minimize cross coupling between the two coils 14 and 18. By completely enclosing the pickup coil 18 with the superconductive surface 10a, the pickup coil 18 is entirely shielded from the ambient field when the superconductive surface 10a is in the superconducting state, thereby increasing the sensitivity of the fluxgate.

While the cross-coupling between the driving coil 14 and the pickup coil 18 may be minimized by orienting the coils 14 and 18 at right angles to each other, this expedient may not prove entirely satisfactory when it is desired to measure small magnetic fields as low as a gamma or less. Such inductive cross coupling may be avoided by eliminating the driving coil 14 and substituting a means for periodically heating the superconductive surface above its critical superconducting temperature.

Referring to FIG. 9, there is shown a laser light source 78 for generating a plused light beam 80. The laser light source 78 may be a giant laser of the kind disclosed on page 60 of the textbook entitled "Lasers" by Bela A. Lengyel, published by John Wiley and Sons, New York, N.Y., 1962. An optical lens 82 is placed between the light source 78 and superconductive surface 10 to cause the pulsed light beam 80 to illuminate the entire area of the superconductive surface 10.

During the periods when the light beam 80 irradiates the superconductive surface 10, the latter is heated above its critical superconducting temperature to drive it into the normal state. During other periods when the light beam 80 is off, the superconductive surface 10 is below the critical temperature and is in the superconducting state.

Figure 5:
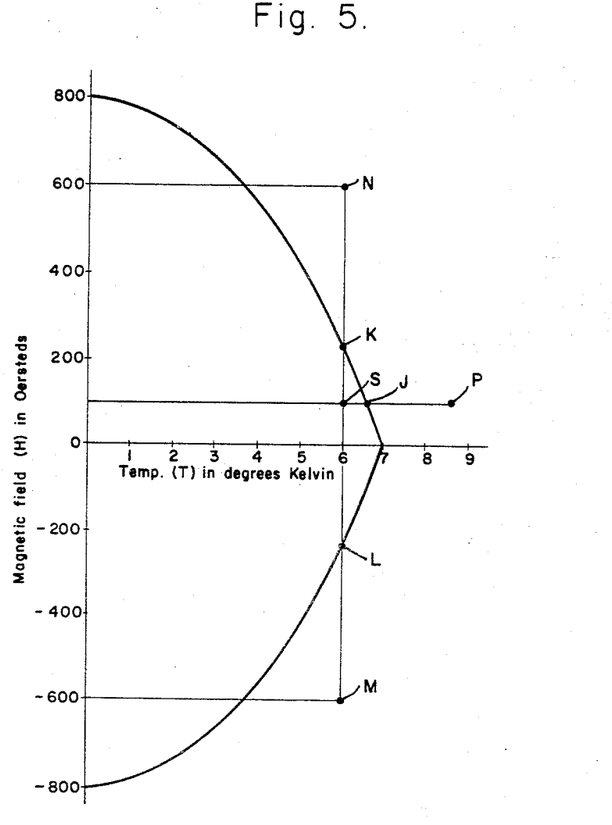
FIG. 5 is a phase diagram showing transitions between superconducting and normal states of the superconductive fluxgate of the invention.

Referring to the phase diagram of FIG. 5, for example, during each period that the laser beam 80 heats the superconductive surface 10, it raises the temperature of struck areas thereof from the point S to some point P above the critical temperature point J to drive the struck areas into the normal state. When the laser beam 80 is off, the temperature reverts back to the point S and the affected areas 80 superconducting again. In this way, the superconductive surface 10 is periodically changed between superconducting and normal states at a frequency equal to the frequency of pulsation of the giant pulse laser source 78.

It will be understood that the arrangement of FIG. 9 is provided with a cryostat, such as that of FIGS. 2 and 9. However, in the interest of ease of illustration, the cryostat is not shown. The pulsed light source may be located outside the cryostat.

An alternative arrangement for varying the temperature of the supercondutive fluxgate above its critical superconducting temperature is shown in FIG. 10. In this arrangement the pickup coil 18 is shown preferably enveloped by the superconductive surface 10a, although it is understood that the surface 10 may be used, if desired. The superconductive surface 10a and pickup coil 18 are immersed in the cryostat 22 containing a bath 86 of liquid helium. A conduit 88 connects the inner chamber of the cryostat 22 with a vacuum pump 90. The pump 90 functions to lower the atmospheric pressure within the chamber so as to reduce the temperature of the liquid helium to a value, such as 3.7° Kelvin for lead, that will establish a superconducting temperature for the superconductive surface 10a.

Means are provided within the cryostat for varying the pressure therein and thereby varying the temperature of the liquid helium bath 86 above the critical superconducting temperature of the superconductive surface 10a. This means may comprise a loud speaker 92 driven by an alternating current source 94. The pressure fluctuations created above the surface of the liquid helium by the loud speaker 92 cause the temperature of the bath 86 and thus the temperature of the superconductive surface 10a to vary above the critical superconducting temperature of the latter at a frequency equal to the frequency of the alternating current source 94. The ambient field is thus chopped at the frequency of the alternating current source. A maximum output signal is sensed when the detector is tuned to the frequency of the alternating current source 94.

The sensitvity, K, of a superconducting fluxgate according to the invention is proportional to the frequency-turns-area product of the pickup coil:

$$K = \frac{2\pi f N A \times 10^{-8}}{(2.54)^2} \frac{\text{volts (peak-to-peak)}}{\text{gausses}}$$

N = Number of turns
$f$ = Operating (self-resonant) frequency (c.p.s.)
A = Effective area (inches$^2$).

The distributed capacity, C, of a multilayer coil is given by:

$$C = \frac{.30 \, Plk}{dT} \mu\mu f$$

where

P = Mean circumference (inches)
$l$ = Axial length (inches)
$\epsilon$ = Average dielectric constant
$d$ = Distance between conductor of adjacent layers (inches)
T = Number of layers
$a$ = Effective radius of coil (inches)

Figure 11:
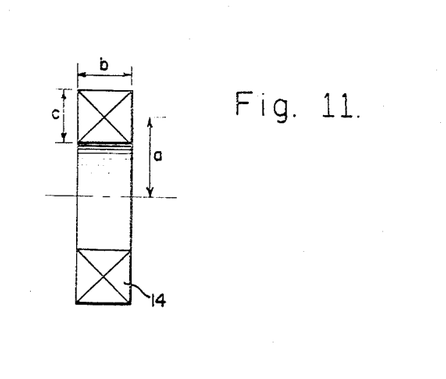
FIG. 11 is a cross-sectional view of a pickup coil useful in the superconductive fluxgate magnetometer.

Referring to FIG. 11 an aproximate expression for the inductance is given by:

$$L = \frac{.8a^2 N^2}{6a + 9b + 10c} \, \mu h \text{ (dimensions in inches)}$$

If we assume $$b = a/2, \quad c = \frac{11}{20}a = \frac{a}{2}$$

$$L \frac{.8a^2 N^2}{6a + 4.5a + 5.5a} = .05aN^2$$

The distributed capacity may be written as $$C = \frac{.30 . 2\pi a . a/2 . \epsilon}{dN^{1/2}} = \frac{.3 \epsilon \pi}{d} \frac{a^2}{N^{1/2}}$$

The self-resonant frequency is then:

$$f = \frac{1}{2\pi \sqrt{LC}} = \frac{.735 d^{1/2}}{\epsilon^{1/2}} N^{-3/4} a^{-3/2}$$

and $$K = \frac{1.95 d^{1/2} \times 10^{-8}}{\epsilon^{1/2}} N^{1/4} a^{1/2}$$

volts (peak-to-peak) per gauss.

The above equation shows that the sensitvity does not change very rapidly (as $N^{1/4}$ and $a^{1/2}$) with N or $a$. If the coil is wound with superconductive wire which does not become normal over the magnetic field levels involved. the resistive losses are zero, and the Q will be very high—being limited only by dielectric and coupled resistive losses. The resonant impedance will be correspondingly high.

The sharpness of the resonance which is described by the Q form of the single-tuned input circuit of FIGS. 6 and 7 will be limited by the input resistance of the amplifier. This resistance shunts the infinite Q parallel-tuned circuit formed by the zero resistance pickup coil 18 and its shunting capacitor 24, so that the net circuit Q is given by $$Q = \frac{R_{input}}{\omega L}.$$

To obtain the maximum input voltage to the amplifier, its input resistance, $R_{24}$, should be as large as possible since $$e_{input} = e_{induced} \times Q$$

where the Q is defined by the previous equation. Input resistance of the order of $10^7$ ohms are easily obtained with vacuum tube or field-effect transistors. However, the resulting Q may be of the order of $10^4$ for $L=10$ millihenries, which is very high, and result in a bandwidth which is either too low for a useable information rate, or too critical in regard to circuit tuning stabilities which may be acieved in practice.

Figure 12:
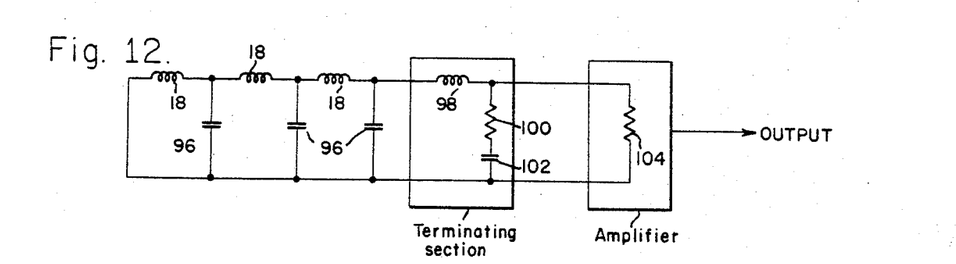
FIG. 12 is a schematic diagram of a pickup coil forming a low pass filter circuit.

One method of increasing the bandwidth to make the tuning less critical is to make the coil into a low-pass filter by adding shunt capacitors, as shown in FIG. 12.

In this embodiment, the pickup coil is formed in three sections 18 arranged in series, with capacitors 96 shunting each section 18. A terminating section is placed across the last capacitor 96, and includes a series inductance 98 and a shunt section including an inductance 100 and a capacitance 102.

The terminating section is one of conventional design, such as disclosed in Reference Data for Radio Engineers, fourth edition, published by International Telephone and Telegraph Corp., New York 22, N.Y., September 1956, pp. 166–167. An input resistance 104 is placed at the input to the amplifiers of FIGS. 6 and 7. The circuit of FIG. 12 replaces the tuned circuit comprising coil 18 and capacitor 24 of FIGS. 6 and 7, for example. By using this low-pass filter configuration, the idealized response, neglecting mutual induction effects between the various portions of the pickup coil, is flat from D.C. to a cut-off frequency given by $$f_{cut-off} = \frac{R_{input}}{\pi L} = \frac{1}{\pi C p_{input}} = \frac{1}{\pi \sqrt{LC}}$$

where L and C are the inductance and capacitor associated with each section of the filter.

There will be some induced noise from eddy currents flowing in the shielding superconductor when it is normal. Also, there apparently is some noise arising from the transition process between the superconducting and normal states, as is evidenced by resistance measurements in the transition region as reported by D. H. Andres, R. M. Milton, and W. DiSorro in "A Fast Superconducting Bolometer," Journal Optical Soc. America, vol. 36, No. 9, September 1946, pp. 518–524. This noise would be minimized by crossing the transition region as quickly as possible. If the transition time is a fixed fraction of the chopping period, this noise would be independent of frequency if the noise spectrum is flat. The component of this noise due to the measured field would be proportional to the field magnitude. There may also be a component due to the driving or chopping field which is cross-coupled by misalignment of the coils, or in the process of the setting up and the destruction of the superconducting domains. This component would be proportional to the critical field at the particular operating temperature, and hence it is desirable to operate as close as possible to the critical temperature, $T_c$, where the least amount of drive field is required.

Figure 13:
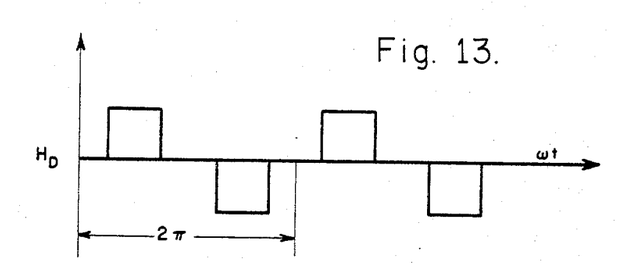
FIGS. 13–16 are graphs of waveforms useful in explaining the harmonic analysis of a superconductive fluxgate output for different drive signal waveforms.

While it is feasible to employ a sinusoidal waveform for the driving signal, a more desirable waveform is that shown in FIG. 13. The improved waveform eliminates errors in the field measurement arising from coupling between drive coil and pickup, drive amplitude drifts and "bias drifts." These various effects are discussed in detail below in conjunction with the following analysis.

Basically the magnetometer consists of the elements shown in FIG. 2. When the superconducting surface 10 is normal, the ambient field passes through the pickup coil 18, but is excluded from the coil 18 when the surface 10 is superconducting. The state of the superconducting surface 10 is determined by the magnitude of the drive field. In the first part of the following harmonic analysis of the measured field it is assumed that the critical drive field peak amplitude is adjusted such that the superconductive surface 10 or "gate" remains open and closed for equal periods, and that the gate switching is fast enough so that the voltage out of the pickup coil 18 can be approximated by a $\delta$ function.

Figure 14:
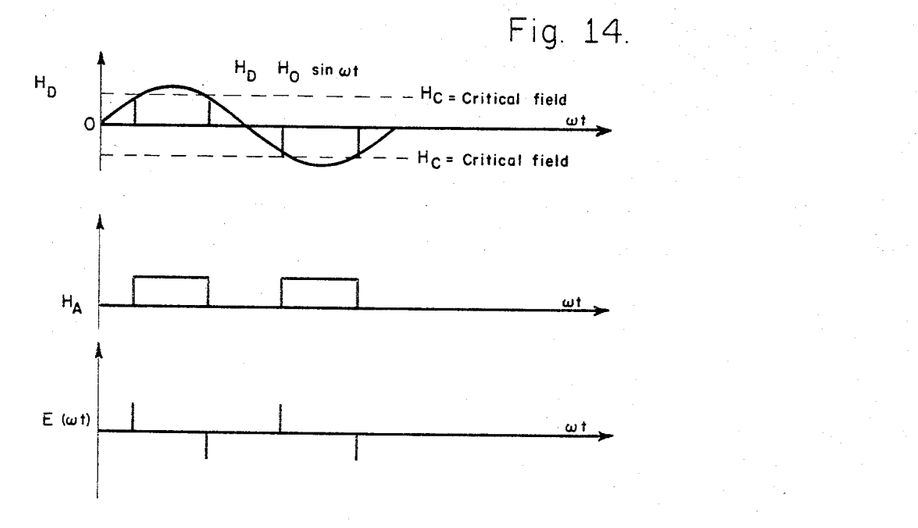

FIG. 14 shows (a) a sinusoidal driving magnetic field, (b) the ambient field as seen by the pickup coil 18 and (c) the voltage at the output of the pickup coil 18, i.e., the derivative of the ambient field at the pickup coil 18.

In terms of $\delta$-functions we may write for $E(\omega t)$ shown in FIG. 13(c), $$E(\omega t) = E_o \left[ \delta\left(\omega t - \frac{\pi}{4}\right) - \delta\left(\omega t - \frac{3\pi}{4}\right) \right] =$$

$$\frac{E_o}{\pi} \sum \left( \sin \frac{\pi}{4} n - \sin \frac{3\pi}{4} n \right) \sin n\omega t$$

Figure 15:
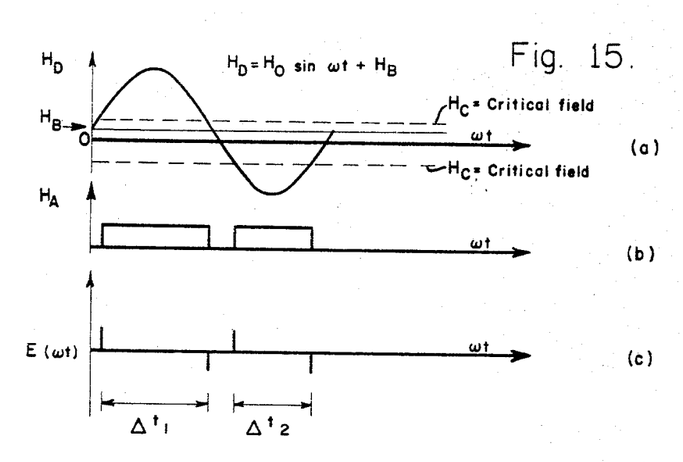

The first three harmonics have amplitudes as follows:
$n=1$ gives an amplitude of zero
$n=2$ gives an amplitude of $2E_o/\pi$
$n=3$ gives an amplitude of zero It should be noted that any number of harmonics may be present in general if the $\delta$-functions are not evenly spaced in time in the way just considered. Experimentally such a situation would arise if the drive field in maximum amplitude were not adjusted properly or if the ambient field is a reasonable fraction of the drive field, as shown in FIG. 15. FIG. 15 shows (a) the bias off-set due to ambient field adding to drive; (b) the field at the magnetometer due to bias effect; and (c) the fluxgate output with bias. Analysis of the function plotted in FIG. 15(c) yields various results for the harmonic content depending on the separation $\Delta t_1$, and $\Delta t_2$. This can be seen from Equation 1 by changing the positions of the $\delta$-functions appropriately.

It should be noted that these errors are completely eliminated if the drive frequency is of the form shown in FIG. 13. The waveform shown in FIG. 13 is therefore preferred for the superconducting fluxgate.

Figure 16:
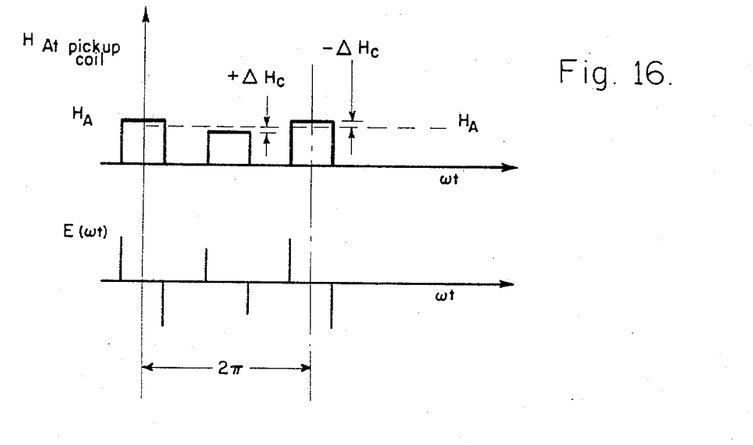

"Cross coupling" between the drive signal and pickup coil is present regardless of the type of drive waveform employed; however the result of cross coupling does not present a problem in interpretation of the resulting signal, when the drive waveform is as shown in FIG. 13. The magnetic field seen by the pickup coil 18 and its derivative are shown in FIG. 16. FIG. 16 shows (a) the field at the magnetometer pickup coil when coupling of magnitude $\Delta H_c$ is present. The field at the coil is the coupled field plus the ambient fiield in the absence of a driving field. FIG. 16 also shows (b) the voltage out of the pickup coil.

Use of the drive signal shown in FIG. 12 gives rise to results shown in FIG. 15a, b if one imposes the realistic assumption that the drive and pickup coils are not orthogonal. In this case the signal out of the pickup coil can again be approximately by a sum of $\delta$-functions yielding $$E(\omega t) = E_1 \left[ \delta\left(\frac{3\pi}{4} - \omega t\right) \right] - E_2 \left[ \delta\left(\frac{\pi}{4} - \omega t\right) \right]$$

$$E(\omega t) = \frac{1}{\pi} \left[ \sum_{n=0}^{\infty} \left( E_1 \sin \frac{3\pi}{4} n - E_2 \sin \frac{\pi}{4} n \right) \sin n\omega t \right]$$

It can be seen that the first missing harmonic occurs at $n=4$, thus, the second harmonic (which is observed) will have an amplitude given by $$E = \frac{E_1 + E_2}{\pi}$$

Since the field coupling is symmetric with respect to the ambient field, the voltage E corresponds to that which one would expect to obtain if there were no coupling whatever.

It thus appears that the drive signal of FIG. 13 essentially eliminates errors of cross coupling, drive amplitude drifts and "bias drifts" (FIG. 15) all of which would be appreciable in the detected second harmonic signal if the drive field were sinusoidal.

Figure 17:
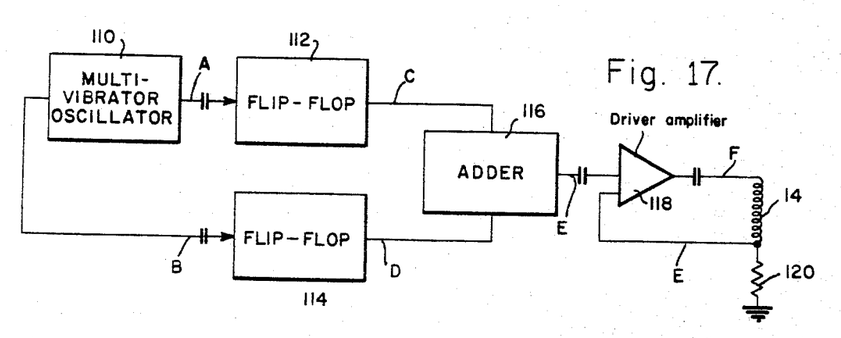
FIG. 17 is a block diagram of a circuit for generating a desired driving waveform for the fluxgate magnetometer of the invention.
Figure 18:
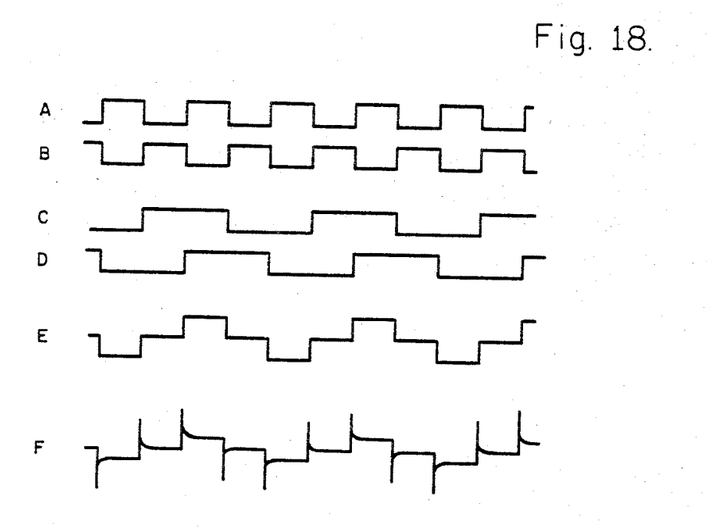
FIG. 18 is a graph of waveforms appearing at certain points of the circuit of FIG. 17.

FIG. 17 shows a block diagram of a circuit for generating the desired drive waveform shown in FIG. 13, and FIG. 18 is a graph of waveforms appearing at certain points of the circuit. These points will be labeled A, B, C, D, E and F and the waveforms on the graph will be correspondingly labeled. Referring to FIGS. 17 and 18, a multivibrator oscillator 110 generates two square waves A and B which are 180° out of phase at a frequency which is twice the drive frequency. The two output waveforms A and B are fed to flip-flops 112 and 114 which change state at input transitions having one polarity, which in the present example is minus. The outputs of the two flip-flops 112 and 114 are square waves C and D at a frequency equal to the drive frequency, and are 90° out of phase. The flip-flop outputs are fed to an adder 116 whose output has the desired waveform E. The adder output has a D.C. component which may be eliminated by A.C. coupling. The output of the adder 116 is fed to a drive amplifier 118, which is also A.C. coupled, and whose output is used to feed the drive coil 14. A resistor 120 in series with the drive coil 14 serves as a feedback resistor to assure that the current waveform is that shown in waveform E rather than the voltage waveform F.

The embodiments of the invention in which an exclusive property or privilege is claimed are defined as follows:

1. A superconductive magnetometer comprising:
   a magnetic pickup means responsive to a component of an ambient magnetic field to be detected,
   a continuous surface of superconductive material or extended area totally enclosing said pickup means and disposed between said ambient field and said pickup means,
   said surface being free of openings and nonsuperconductive regions that would adversely affect the response of said magnetic pickup means to said ambient magnetic field,
   means for initially establishing a superconductive state in said surface to effectively isolate said pickup means from said ambient field, means for causing said superconductive surface to alternate between the superconducting and nonsuperconducting states at a given frequency, whereby said magnetic pickup means is alternately exposed and isolated from said ambient magnetic field,
   said last mentioned means alternating said surface between said two states without creating persisting changes in said superconductive surface,
   and detector means coupled to said magnetic pickup means and tuned to a narrow band including a harmonic of said given frequency for deriving an output signal representative of said ambient magnetic field.

2. The superconductive magnetometer as set forth in claim 1 in which said means for causing said superconductive surface to alternate between the superconducting and non superconducting states is an alternating magnetic field.

3. The superconductive magnetometer as set forth in claim 1 in which said means for causing said superconductive surface to alternate between the superconducting and non superconducting states is a means for varying the temperature of the superconductive material.

4. A superconductive magnetometer comprising:
   a magnetic pickup means responsive to a component of an ambient magnetic field to be detected,
   a continuous surface of superconductive material of extended area disposed adjacent one side of said pickup means and between said ambient field and said pickup means,
   said surface being free of openings and nonsuperconductive regions that would adversely affect the response of said magnetic pickup means to said ambient magnetic field,
   said surface extending beyond the extremities of said magnetic pickup means, whereby an appreciable number of magnetic flux lines of said ambient magnetic field are excluded from said pickup means,
   means for initially establishing a superconductive state in said surface to effectively isolate said pickup means from said ambient field,
   a laser light source for generating a pulsed light beam at a given frequency to illuminate the entire area of the superconductive surface to heat the latter thereby causing said superconductive surface to alternate between the superconducting and nonsuperconducting states at said given frequency, whereby said magnetic pickup means is alternately exposed and isolated from said ambient magnetic field,
   said last mentioned means alternating said surface between said two states without creating persisting changes in said superconductive surface,
   and detector means coupled to said magnetic pickup means and tuned to a narrow band including a harmonic of said given frequency for deriving an output signal representative of said ambient magnetic field.

References Cited

UNITED STATES PATENTS

| | | | |
|---|---|---|---|
| 2,786,179 | 3/1957 | Arnold et al. | 324—43 |
| 2,914,735 | 11/1959 | Young | 335—216 |
| 3,056,889 | 10/1962 | Nyberg | 335—216 |
| 3,098,189 | 7/1963 | Buchhold. | |
| 3,218,547 | 11/1965 | Ling | 324—43 |
| 3,263,149 | 7/1966 | Meiklejohn. | |

OTHER REFERENCES

Nethercot, A.H.; IBM Technical Disclosure Bulletin; A Cryogenic Circuit Gate Utilizing an Injection Laser; vol. 6, No. 5, October 1963.

RUDOLPH V. ROLINEC, *Primary Examiner.*

R. J. CORCORAN, *Assistant Examiner.*